United States Patent

[11] 3,555,171

[72] Inventor Robert L. Larson
2873 Velasco Lane, Costa Mesa, Calif. 92626
[21] Appl. No. 748,285
[22] Filed July 29, 1968
[45] Patented Jan. 12, 1971

[54] CABLE CONNECTION INSULATOR AND SEAL
4 Claims, 5 Drawing Figs.

[52] U.S. Cl. .................................................. 174/138,
174/77, 174/93, 277/110
[51] Int. Cl. ..................................................... H02g 15/02,
H02g 15/08
[50] Field of Search ........................................... 174/84,
91—93, 76, 77, 65.1, 138.4; 285/(Inquired),
350—351, 379, (Digest); 277/(Inquired), 111,
110; 151/14.5

[56] References Cited
UNITED STATES PATENTS
| | | | |
|---|---|---|---|
| 2,542,583 | 2/1951 | Shea, Jr. ........................ | 174/77UX |
| 2,621,228 | 12/1952 | Tompers ....................... | 174/93 |
| 2,700,140 | 1/1955 | Phillips .......................... | 174/77X |
| 2,938,940 | 3/1960 | Calendine et al. ............ | 174/93X |

Primary Examiner—Darrell L. Clay
Attorney—William H. Maxwell

ABSTRACT: An insulated enclosure for spliced electrical conductors, wherein abutted ends of electrical cables are stripped of sheathing and are joined by a connector sleeve, providing an imperforate hermetically sealed closure for the cable connection that fully embraces the connector sleeve and stripped portions of cable and sealed with the sheathing, thereby assuring continuity of insulation surrounding the connected cables.

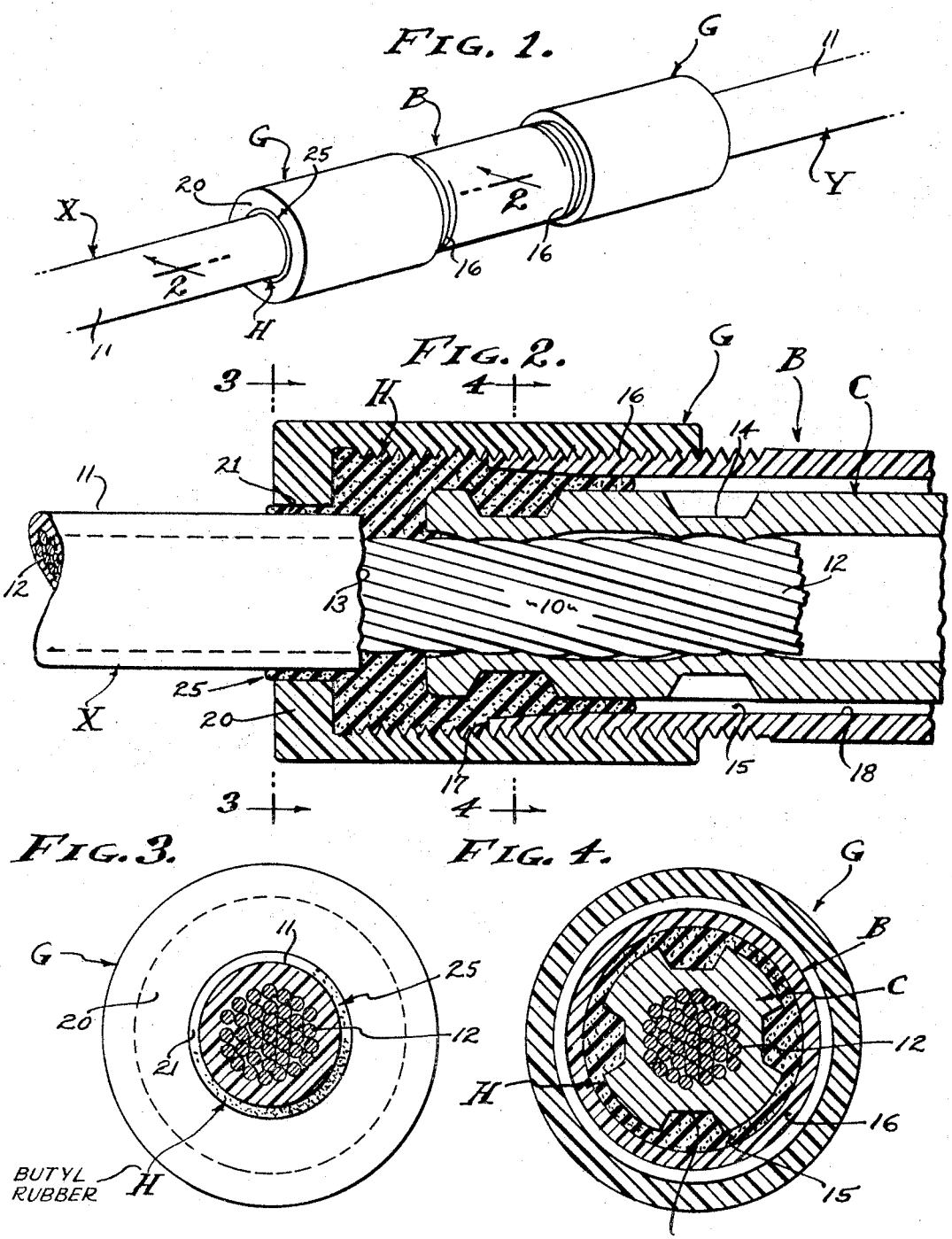
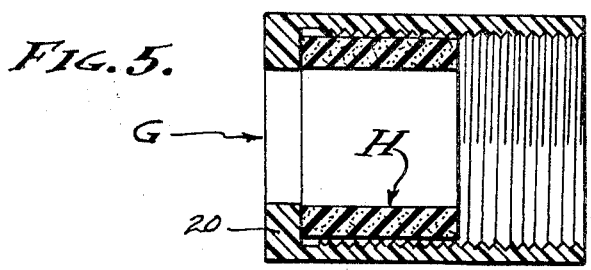

CABLE CONNECTION INSULATOR AND SEAL

The transmission of electrical power through cables requires the separation thereof, either by space or by use of insulation. In the case of subterranean transmission of power, insulated cables are buried in the ground and/or run through conduits, and like situations arise in structures where the electrical power is transmitted through structural columns, shafts, tunnels and channels. In any case, it is the conduction of electrical power through wires and cables, regardless of size, that are insulated with a dielectric sheathing with which the present invention is concerned and wherein it is an object to provide a continuing insulation over the connection that is made.

Electrical cables of the type under consideration vary greatly in circular mil capacity and the cross-sectional size varies greatly dependent upon the material used in the conductor. Also, the conductor per se can be of a single or of multistrands, and in all cases housed within a coextensively encompassing insulating sheath. It is this sheath to which the insulator and seal of the present invention is hermetically sealed, with an insulator fully embracing the connector sleeve and stripped cable ends. An object, therefore, is to provide for hermetically sealing to the intact cable insulation at and around where the cable has been stripped for contact with the connector sleeve.

No claim is made herein to the cable and its insulation, nor is any claim made to the connector sleeve per se; however it is an object of this invention to press out substantially all air and to subsequently seal off around the intact cable sheath by extrusion of plastic hermetic into any and all interstices that occur, whether as a result of manufacture of the elements involved or as a result of the reformation of said elements by workmen in the field. That is, discrepancies in manufacture and imperfection in the manual art of stripping the cable ends and mechanical application of the connector sleeves are all accommodated in the extrusion of hermetic with the gland as it is cooperatively related herein to an insulator body.

Specifically, it is the axial end-to-end abutted engagement and connection of electrical cables with which the present invention is concerned, it being an object to establish imperforate continuity of an all-embracing dielectric insulation from the intact insulating sheath of one cable section to that of another. To these ends, the combination of elements hereinafter disclosed is coaxially arranged with provision for the usual deflections and normal misalignments.

The various objects and features of this invention will be fully understood from the following detailed description of the typical preferred form and application thereof, throughout which description reference is made to the accompanying drawings, in which:

FIG. 1 is a perspective view illustrating the connection of two cable sections with the insulator and seal embracing the same.

FIG. 2 is an enlarged detailed sectional view taken as indicated by line 2–2 on FIG. 1.

FIGS. 3 and 4 are sections taken as indicated by lines 3–3 and 4–4 on FIG. 2, and FIG. 5 is a sectional view of the gland and hermetic as it is prepared in combination for use in the present invention.

The elements of the present invention are best formed of plastic dielectric materials, except for the electrical conductors 10, and those elements which are exposed are preferably either fireproof or self-extinguishing. For example, the exposed elements are comprised of a body B and a gland G, both of which are made of self-extinguishing polyvinyl chloride. And in practice, the exposed insulating sheath 11 supplied on the conductor 10 is cross-link polyethelene, a plastic which is commonly employed as insulation. Such plastics, both polyvinyl chloride and polyethelene are relatively flexible, in that they can be deflected and warped into the directions and configurations into which the conductors 10 are bent and/or turned. Therefore, the axes of abutted cable ends are most likely to be imperfectly aligned, as a result of the cables being warped into position. For the purpose of this disclosure the cable conductor 10 and its insulating sheath 11 can be considered to be substantially straight and the insulator and seal elements arranged coaxially therearound, the substantial concentricity of the latter being inherent upon the application of installation pressures.

In FIG. 1, I have illustrated a completed installation wherein two cables X and Y are joined by a connector sleeve C (one end of which is shown in FIG. 2) and covered by insulator body B and sealed by glands G at opposite ends over the cables X and Y. The two ends of the insulator and seal are alike, a description of one sufficing for a description of the other. Therefore, the following detailed description will elate to but one end of the structure, as shown detailed in FIG. 2, it being understood that said one end of the structure can be applied to any situation where but one cable X or Y is to enter through a body B and for example directly into a piece of equipment from which the body B extends, or to be applied structurally as shown and in any case as circumstances require.

The cable X and/or Y is an electrical conductor and is shown as a multistrand cable comprised of a plurality of filaments 12 bundled tightly together in helical formation. The insulating sheath 11 is of substantial thickness extruded onto and around the stranded cable to fill into and occupy the interstices between the outermost filaments 12. It is the sheath 11 that is circumcised at 13 and the end portion removed and disposed of so as to expose the end portion of the conductor 10 for electrical connection. As shown, the conductor 10 is five-eighth inch diameter and 3 ¼ inch thereof is exposed by removal of the polyethelene insulation sheath.

The connector sleeve C is provided in the usual manner and is commonly referred to as a "compression connector." The sleeve C is a cylindrical tube that slides over the exposed and stripped end portion of the conductor 10 to engage electrically therewith and to mechanically hold the cable end or ends. In practice, the sleeve C has a tubular wall of substantial thickness and is made of malleable conductive material that can be readily swaged onto the conductor 10. A usual practice is to indent the sleeve C at a plurality of places 14 so that the material thereof is moved to flow radially inward and over and into pressured contact within the interstices presented by the surface strands 12. Thus, the connector sleeve C is electrically connected to the cable ends or conductors 10 and mechanically couples them.

In accordance with the invention I provide the insulator body B and gland or glands G which are assembled over the cables X and Y prior to the connector sleeve C installation above described. That is, the insulator body B and gland or glands G are loosely embraced over the cables. As indicated, the glands G are engaged over the opposed cable ends respectively and each gland is disposed to face openly toward the open end of the insulator body B to which it is threaded. All features for a hermetically sealed connection are included in the loose assembly of parts engaged over the connected cable ends as thus far described.

The insulator body B is a cylindrical tube preferably of polyurethane or polyvinyl chloride with a bore 18 fitted loosely over the connector sleeve C to leave a limited annulus 15 therebetween. In practice, the bore 18 is outwardly tapered as it emanates at end 17 of the body B, in order to induce entry therein of the hermetic H. It is significant that this annulus is provided and which cooperates with the hermetic H of the gland G as later described. The insulator body B has a substantially elongated end portion 16 that is externally threaded and which terminates at the end 17 at or about the terminal end of the connector sleeve C hereinabove described. Thus, the hermetic H is directed to flow into the annulus 15.

The gland G, in each instance, is a cup-shaped element and in the case illustrated it is internally threaded to move axially onto the externally threaded end portion 16 of the insulator body B. The cup-shaped gland G is therefore provided with a diametrically disposed wall 20 fitted loosely over the outer diameter of the insulating sheath 11 to leave a limited annulus 21, preferably of more restricted cross-sectional area as compared with the above-described annulus 15. The wall 20 is of substantial axial thickness so as to ensure that the gland overlies the stripped portion of the cable, and it will be apparent how the gland G is threadedly engaged onto the insulator body B so as to pull into the installed position shown with the wall 20 opposed to the end 17 of the connector body B. Although the gland G is preferably made of dielectric material, it is feasible to make the gland of metal if so desired.

The hermetic H is provided in accordance with the invention and is a dielectric sealant material of plastic nature that is capable of being extruded at manual pressures such as to be applied through manual turning of the gland G, with or without tools such as wrenches and the like. A waterproof and moldable adhesive substance is employed and preferably butyl rubber of viscous nature capable of flowing under said manual pressures. In practice, and as clearly illustrated in FIG. 5 the hermetic H is initially installed as a cylindrical tube; within the confines of the cup-shaped gland G, having an outer diameter engageably carried within the internally threaded gland G, and having an inner diameter that loosely engages over the outer diameter of the connector sleeve C. Upon the application of endwise pressure to the hermetic cylindrical liner, the material thereof being captured in a chamber is forced to flow radially inward to fill all interstices and thereby to displace air outwardly through annulus 21. Upon continued application of endwise pressure to the hermetic cylindrical liner, the material thereof is forced to flow axially and at first into the annulus 15 of least restriction and upon reaching a substantial depth therein secondly flows into the annulus 21 of greater restriction. When a bead 25 of hermetic H is visible at the exterior of the gland G, as a continuous ring, then the hermetic seal is complete. And, in the process of installation the hermetic H also extrudes somewhat into the threaded connection to seal therewith.

From the foregoing it will be apparent that a very simple and practical insulator and seal is provided. The electrical conductor ends are coupled in the usual manner by a connector sleeve C and the entire electrical and mechanical connection is embraced within the assembly of the insulator body B and gland or glands G. Upon the application of the gland G whereby hermetic H is extruded into all interstices, and finally from the annulus 21 for visible inspection, a hermetically sealed condition is assuredly established. Still further, the insulator body B and gland G are advantageously made of transparent material so that the progressive movement of the hermetic H is visible. As indicated, substantial concentricity of all parts involved is inherent upon the application of extrusion pressures applied to the hermetic H which flows into and occupies both annulus 15 and annulus 21.

Having described only a typical preferred form and application of my invention, I do not wish to be limited or restricted to the specific details herein set forth, but wish to reserve to myself any modifications or variations that may appear to those skilled in the art.

I claim:

1. A splice enclosure insulator and seal for hermetic engagement over and with an intact insulation sheath from which a bared electrical conductor projects to enter into a connector sleeve, and including, an elongated tubular insulator body having an end normal to its axis and made of dielectric material, a cup-shaped gland having a cylindrical wall engaged with the insulator body and having an inwardly disposed wall with an axially concentric opening therethrough with clearance to loosely pass said insulation sheath, said inwardly disposed wall being faced to oppose said end of the insulator body, a tubularly cylindrical liner with an axially concentric opening therethrough with clearance to loosely pass said insulation sheath and made of adhesive plastic hermetic dielectric sealant material cohesively carried within the cylindrical wall of the cup-shaped gland and against the inwardly disposed wall thereof, and means to move the cup-shaped gland onto the insulator body and to press the tubularly cylindrical liner between said end of the insulator body and said inwardly disposed wall of the cup-shaped gland.

2. The splice enclosure as set forth in claim 1, wherein the cup-shaped gland is threadedly engaged onto the insulator body thereby comprising said means to move and to press the cup-shaped gland wall in opposition to said end of the insulator body.

3. A splice enclosure insulator and seal for hermetic engagement over and with oppositely extending intact insulation sheaths from which juxtapositioned and aligned bared electrical conductors project from axially opposite openings in a connector sleeve, and including, an elongated tubular insulator body having opposite ends normal to its axis and made of dielectric material, a pair of cup-shaped glands and each having a cylindrical wall engaged with opposite ends of and onto the insulator body and each having an inwardly disposed wall with an axially concentric opening therethrough with clearance to loosely pass said insulation sheaths, said inwardly disposed walls being faced to oppose said opposite ends of the insulator body respectively, a pair of tubularly cylindrical liners and each with an axially concentric opening therethrough with clearance to loosely pass said insulation sheaths respectively and each made of adhesive plastic hermetic dielectric sealant material cohesively carried within the cylindrical wall of one of said cup-shaped glands and against the inwardly disposed walls thereof respectively, and means to move each of said cup-shaped glands onto the insulator body and to press the tubularly cylindrical liners between the said opposite ends of the insulator body and said inwardly disposed walls of the cup-shaped glands respectively.

4. The splice enclosures as set forth in claim 3, wherein the cup-shaped glands are threadedly engaged onto the insulator body thereby comprising said means that press and move the gland walls in opposition to said opposite ends of the insulator body.